N. H. THOMPSON.
MULTIPLEX TELEGRAPHS.
No. 181,742. Patented Aug. 29, 1876.
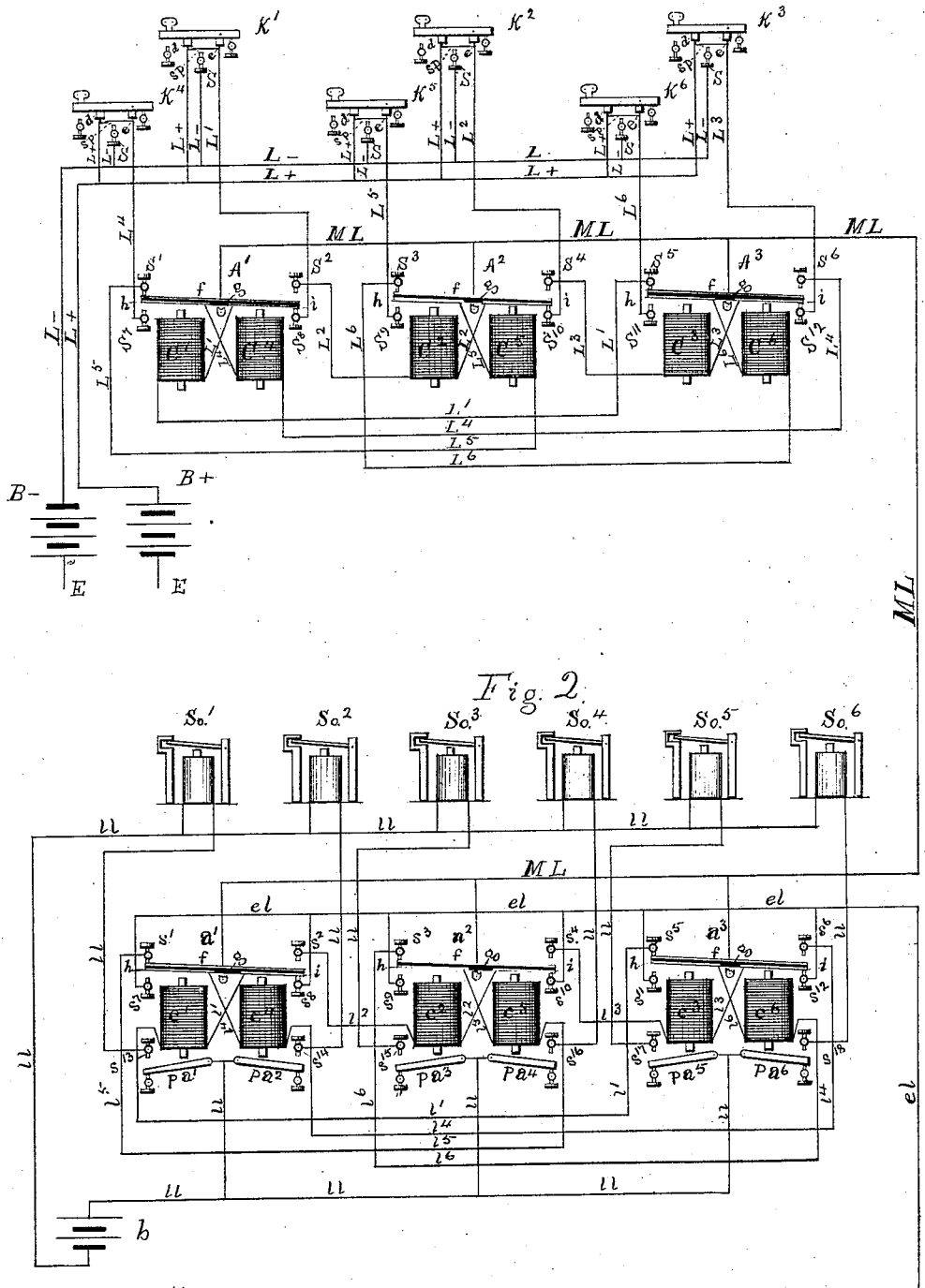
Witnesses:
Frank Baker.
Jabez Fox
Inventor:
N. H. Thompson.

UNITED STATES PATENT OFFICE.

NILES H. THOMPSON, OF ALBION, MICHIGAN.

IMPROVEMENT IN MULTIPLEX TELEGRAPHS.

Specification forming part of Letters Patent No. 181,742, dated August 29, 1876; application filed July 1, 1876.

*To all whom it may concern:*

Be it known that I, NILES H. THOMPSON, of Albion, Michigan, have invented a device for transmitting a number of telegraph-dispatches over a single wire at one time, of which the following is a specification:

The nature of my invention consists in causing a current of electricity to operate automatically a suitable device for closing and breaking a number of electric circuits in very rapid succession. The current operating the device flows successively through the several circuits when they are closed, and is thus broken into short impulses, which follow each other with great rapidity. At the transmitting-station keys devised for reversing the direction of the current are placed in each circuit. When any one of these keys is depressed reverse impulses will flow through the circuit to which it belongs, while direct impulses will continue to flow through the other circuits. At the receiving-station a polarized armature, so arranged that a local circuit (including a sounder) is closed by it when reverse impulses are transmitted, is placed in each of the circuits. In this manner each circuit is provided, at the transmitting-station, with a key, controlling a sounder at the receiving-station, without interfering with the flow of impulses at the same time through the other circuits. In this way, while several of the local circuits may be closed at the same time, and remain closed so long as the keys controlling them are depressed, the line-circuits are closed and broken in very rapid succession. As in such case only one line-circuit is closed at any one time, a single conducting-wire may form a portion of all the circuits without any interference occurring between the impulses flowing through it; and this wire may be used as the main line between the transmitting and receiving stations.

I will now describe a device involving my invention, referring to the drawings hereto attached and forming a part of this specification.

This device is designed for transmitting six dispatches. It will be seen upon examination that by adding other instruments it may be arranged for transmitting an indefinite number.

Figure 1 represents the transmitting, and Fig. 2 the receiving, instruments.

$B+$ is a battery transmitting a current from the sending to the receiving station. $B-$ is a battery transmitting a current in the reverse direction. $K^1 K^2 K^3 K^4 K^5 K^6$ are keys for sending the dispatches. When the keys are at rest the springs $sp$, which are joined at $e$ with wires leading to the coils C, form a contact at $d$ with a wire from battery $B+$. When the keys are depressed the springs $sp$ come in contact at S with a wire from battery $B-$, and contact at $d$ is broken. $C^1 C^2 C^3 C^4 C^5 C^6 c^1 c^2 c^3 c^4 c^5 c^6$ are electro-magnets or coils, arranged in pairs. Each pair is provided with a lever, $A^1 A^2 A^3 a^1 a^2 a^3$, oscillating about an axis in the middle, and carrying near each end an armature (not shown in the drawing) for each of the coils. These levers are composed of conductors $f\ h\ i$, insulated from each other by non-conductors $g$, and serve to close and break the circuits, as described below. To give these levers a more specific name I will designate them "switches." $pa^1 pa^2 pa^3 pa^4 pa^5 pa^6$ are switches, carrying polarized armatures, (not shown,) which are repelled while a direct and attracted while a reverse current is passing through the coils to which they belong, so that the switches change their position only when a change occurs in the direction of the current.

$S^1 S^2 S^3 S^4 S^5 S^6 S^7 S^8 S^9 S^{10} S^{11} S^{12}\ s^1 s^2 s^3 s^4 s^5 s^6 s^7 s^8 s^9 s^{10} s^{11} s^{12} s^{13} s^{14} s^{15} s^{16} s^{17} s^{18}$ are stops, which limit the movement of the switches, and through which connection is made between the conductors and wires.

$b$ is a local battery for working the sounders $So^1 So^2 So^3 So^4 So^5 So^6$. The local circuits working the sounders are broken when the switches $pa$ rest against the back stops, and closed when they are in contact with the stops $s^{13} s^{14} s^{15} s^{16} s^{17} s^{18}$.

$L+$ is a wire leading from battery $B+$ to the keys at $d$.

$L-$ is a wire leading from battery $B-$ to the keys at S.

$L^1 L^2 L^3 L^4 L^5 L^6\ l^1 l^2 l^3 l^4 l^5 l^6$ are wires forming, with the wires just described and the wires ML, E, and $el$, the several circuits. ML is the main line. E E $el$ are wires leading to earth.

The several circuits (six in number) are formed as follows: The wires L+ L—, the main line ML, and the earth-lines E E $el$ are included in all the circuits. At the keys the several circuits divide, being thence formed thus: Circuit 1—From key $K^1$, through wire $L^1$, to stop $S^8$; through conductor $i$, (lever $A^1$,) wire $L^1$, coil $C^1$, and wire $L^1$, to stop $S^5$; through conductor $f$ ($A^3$) to main line ML; through main line, conductor $f$, ($A^3$, Fig. 2,) to stop $s^5$; through wire $l^1$, coil $c^1$, wire $l^1$, conductor $i$, ($a^1$,) to stop $s^8$; through earth-line $el$ to earth; through earth and earth-line E to battery. Circuit 2—From key $K^2$, through wire $L^2$, stop $S^{10}$, conductor $i$, ($A^2$,) wire $l^2$, coil $C^2$, wire $l^2$, stop $S^2$, conductor $f$, ($A^1$,) main line, conductor $f$, ($a^1$,) stop $s^2$, wire $l^2$, coil $c^2$, wire $l^2$, conductor $i$, ($a^2$,) stop $s^{10}$, earth-line $el$, earth, earth-line E, to battery. Circuit 3—From key $K^3$, through wire $L^3$, stop $S^{12}$, conductor $i$, ($A^3$,) wire $L^3$, coil $C^3$, wire $L^3$, stop $S^4$, conductor $f$, ($A^2$,) main line, conductor $f$, ($a^2$,) stop $s^4$, wire $l^3$, coil $c^3$, wire $l^3$, conductor $i$, ($a^3$,) stop $s^{12}$, earth-line $el$, earth, earth-line E, to battery. Circuit 4—From key $K^4$, through wire $L^4$, stop $S^7$, conductor $h$, ($A^1$,) wire $L^4$, coil $C^4$, wire $L^4$, stop $S^6$, conductor $g$, ($A^3$,) main line, conductor $f$, ($a^3$,) stop $s^6$, wire $l^4$, coil $c^4$, wire $l^4$, conductor $h$, ($a^1$,) stop $s^7$, earth-line $el$, earth, earth-line E, to battery. Circuit 5—From key $K^5$, through wire $L^5$, stop $S^9$, conductor $h$, ($A^2$,) wire $L^5$, coil $C^5$, wire $L^5$, stop $S^1$, conductor $f$, ($A^1$,) main line, conductor $f$, ($a^1$,) stop $s^1$, wire $l^5$, coil $c^5$, wire $l^5$, conductor $h$, ($a^2$,) stop $s^9$, earth-line $el$, earth, earth-line E, to battery. Circuit 6—From key $K^6$, through wire $L^6$, stop $S^{11}$, conductor $h$, ($A^3$,) wire $L^6$, coil $C^6$, wire $L^6$, stop $S^3$, conductor $f$, ($A^2$,) main line, conductor $f$, ($a^2$,) stop $s^3$, wire $l^6$, coil $c^6$, wire $l^6$, conductor $h$, ($a^3$,) stop $s^{11}$, earth-line $el$, earth, earth-line E, to battery. The local circuits are formed, respectively, from battery $b$, through wires $l\ l$, levers $pa^1\ pa^2\ pa^3\ pa^4\ pa^5\ pa^6$, stops $s^{13}\ s^{14}\ s^{15}\ s^{16}\ s^{17}\ s^{18}$, wires $l\ l$, sounders $So^1\ So^2\ So^3\ So^4\ So^5\ So^6$, wires $l\ l$, to battery $b$.

When the switches $A^1\ A^2\ A^3\ a^1\ a^2\ a^3$ are in the positions shown by the drawings, resting, respectively, against stops $S^1$ and $S^8$, $S^3$ and $S^{10}$, $S^5$ and $S^{12}$, $s^1$ and $s^8$, $s^3$ and $s^{10}$, $s^5$ and $s^{12}$, circuit 1 is closed. The other circuits are broken. A current will then flow through circuit 1. The electro-magnets $C^1$ and $c^1$ will be excited, attracting their armatures, and moving levers $A^1$ and $a^1$, respectively, against stops $S^7\ S^2$ and $s^7\ s^2$. Circuit 1 will then be broken, and circuit 2 will be closed. A current will then flow through circuit 2, exciting electro-magnets $C^2$ and $c^2$, attracting their armatures and moving switches $A^2$ and $a^2$ against stops $S^9\ S^4$ and $s^9\ s^4$, breaking circuit 2 and closing circuit 3. The remaining circuits will in like manner be broken and closed in succession to the end of the series, when the switches will be again in the same positions as at first, and the changes just described will be repeated, so long as the battery continues its action.

In this way each circuit is closed momentarily in rapid succession, breaking the current into short impulses, which follow each other with great rapidity through the keys and coils. The impulses that flow through key $K^1$ and coil $C^1$ flow also through coil $c^1$, and in like manner with the other circuits.

Now, so long as the keys remain at rest, direct impulses flow through all the circuits, and, the polized armatures not being affected thereby, the local circuits that operate the sounders remain broken. When, however, any of the keys are depressed, the direction of the current is reversed through such keys, and through the coils which correspond to them. The polarized armatures of such coils are attracted, the corresponding local circuits closed, and the corresponding sounders operated. So long as any key remains depressed, reverse impulses continue to flow through it and the corresponding coil at the receiving-station, and the local circuit remains closed. When such key returns to rest, direct impulses at once flow, the polarized armature is repelled, breaking the local circuit. In this manner each key at the transmitting-station controls a sounder at the receiving-station, so that by using the Morse system of writing, dispatches may be sent by any or all of the keys at the same time, and each dispatch will be received through a separate sounder.

For the sake of clearness I have shown a simple form of device; but the form of construction may be varied as desired. For example, instead of single coils, with polarized armatures at one end, the ordinary form of double coil may be used, and the polarized armatures placed between the poles of the magnets.

Other devices may be employed involving the principle of my invention. For example, instead of oscillating switches, a rotating wheel with conductors running through it, and carrying armatures on its periphery, may be used. While, therefore, I adopt and claim the device described above, I do not limit my claim thereto.

Instead of using a current of reverse polarity for operating polarized armatures, a current of greater intensity may be used, by substituting for the polarized armatures other armatures held back by retractile springs, so adjusted as to yield only to a current of greater intensity; and by adding other keys, for changing the intensity of the current, armatures with retractile springs, adjusted as described, may be used in addition to the polarized armatures. By this means double the number of dispatches may be sent.

I claim as my invention—

1. A device consisting of one or more switches, combined with and operated automatically by one or more electro-magnets, in such a manner as to break and close two or more electric circuits in succession.

2. A device consisting of one or more switches, operated automatically by one or more electro-magnets, combined with two or more electric circuits, so arranged that when one circuit is broken another will be closed, and so on through the series, in a regular order, again and again.

3. A device consisting of one or more switches, operated automatically by one or more electro-magnets, so as to break and close two or more electric circuits in succession, combined with two or more keys, so constructed as, when manipulated, to change the electrical condition of the current through any or all of the circuits.

4. A device consisting of one or more switches, operated automatically by one or more electro-magnets, so as to break and close two or more electric circuits in succession, combined with two or more armatures, so constructed as to break and close secondary circuits, operating sounders or other receiving-instruments, whenever the electrical condition of the current flowing through the primary circuits is changed.

5. The combination, with transmitting-instruments consisting of one or more switches, operated automatically by one or more electro-magnets, so as to break and close two or more electric circuits in succession, of receiving-instruments consisting of one or more switches, operated automatically by one or more electro-magnets, so as to break and close the said circuits at the same time they are broken and closed by the switches of the transmitting-instruments.

6. The combination, with transmitting-instruments consisting of one or more switches, operated automatically by one or more electro-magnets, so as to break and close successively two or more electric circuits, in each of which is placed one or more keys, so constructed as, when manipulated, to change the electrical condition of the current flowing through any of the circuits, of receiving-instruments consisting of one or more switches, operated automatically by one or more electro-magnets, so as to break and close the said circuits, respectively, at the same time they are broken and closed by the switches of the transmitting-instruments, and armatures placed in the said circuits, so constructed as to break and close secondary circuits, operating sounders or other receiving-instruments, whenever the electrical condition of the current flowing through any of the primary circuits is changed by the manipulation of the said keys, and arranged substantially as described, so that two or more telegraph-dispatches may be transmitted through a single conducting-wire, forming a portion of all the primary circuits, at one time.

NILES HIBBARD THOMPSON.

Witnesses:
 JABEZ FOX,
 FRANK BAKER.